UNITED STATES PATENT OFFICE.

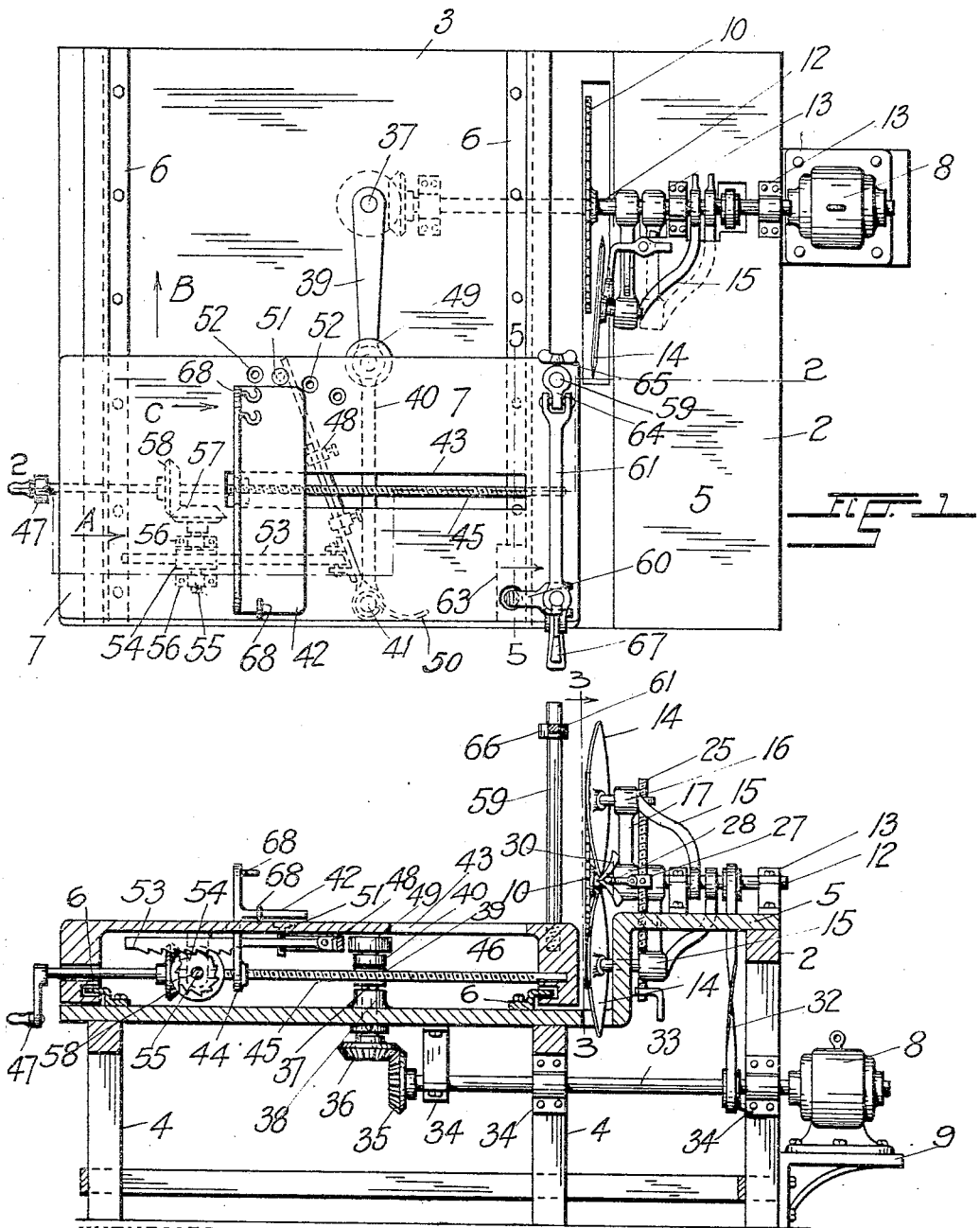

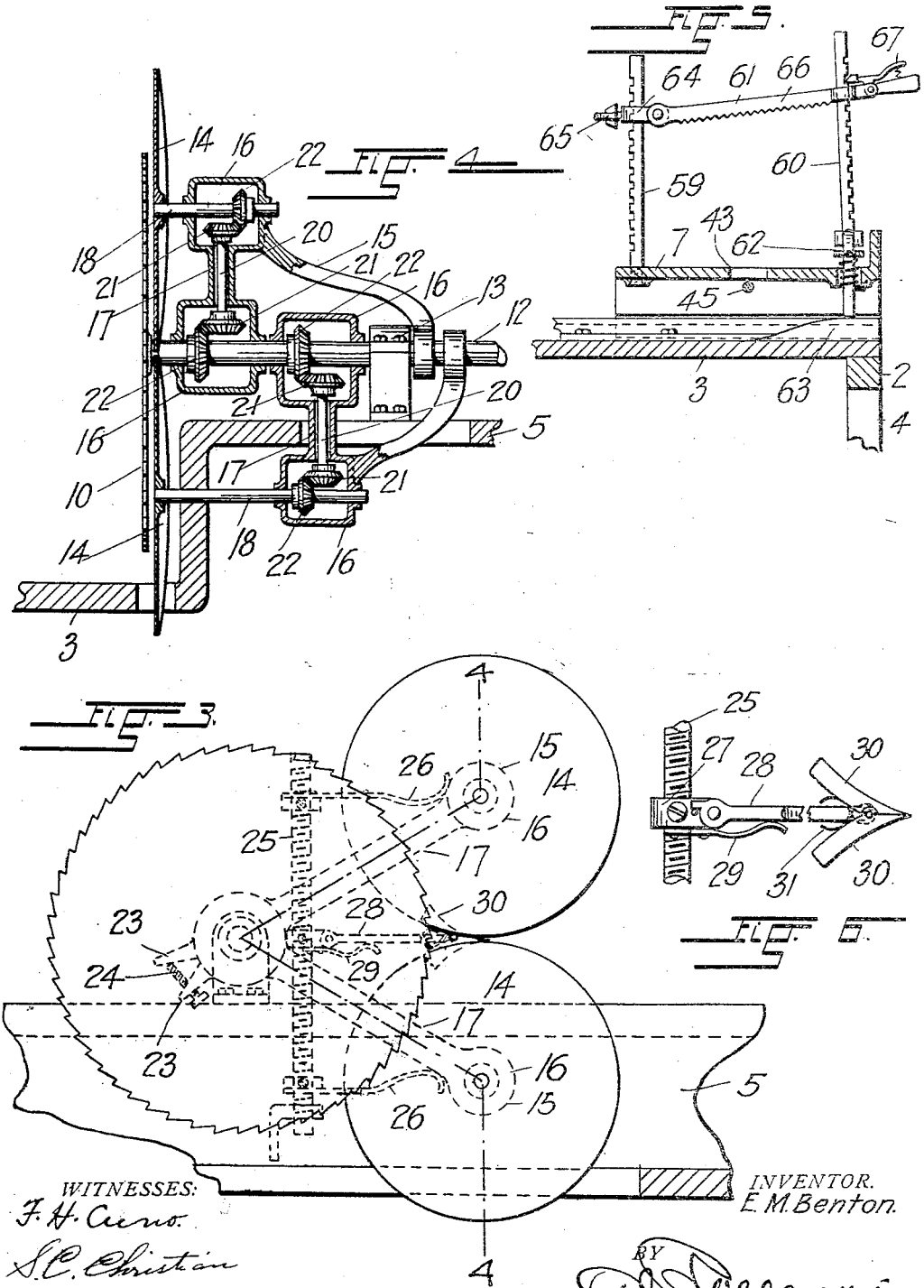

EARL M. BENTON, OF GREELEY, COLORADO.

MEAT-CUTTING MACHINE.

1,130,248. Specification of Letters Patent. Patented Mar. 2, 1915.

Application filed March 11, 1913. Serial No. 753,500.

*To all whom it may concern:*

Be it known that I, EARL M. BENTON, a citizen of the United States, residing at Greeley, in the county of Weld and State of Colorado, have invented certain new and useful Improvements in Meat-Cutting Machines, of which the following is a specification.

My invention relates to meat cutting machines and its object is to provide a power driven machine by means of which a joint of meat may be rapidly divided into slices of any desired thickness.

With the above object in view I provide in coöperative relation to each other a pair of rotary knives which in the operation of the machine, sever the meat of the joint, a saw which cuts the bone of the same, a reciprocating carriage which moves the joint in engagement with the cutting elements, a feeding mechanism which after a slice has been severed from the joint, automatically feeds the latter a predetermined distance before it is again brought in engagement with the knives and the saw, and a clamping apparatus by means of which the joint is held firmly in place on the carriage during the cutting process, and automatically released while it is subsequently advanced by the feeding mechanism above referred to.

In addition to the above enumerated elements I provide an auxiliary cutting member which after the rotary knives have severed the meat, cuts the small portion of the same adjacent the bone, which the said knives could not reach, to provide a path for the saw and thus prevents the production of a ragged cut.

An embodiment of my invention has been illustrated in the accompanying drawings in the various views of which like parts are similarly designated and in which, Figure 1 represents a plan view of the machine, Fig. 2, a section taken along the line 2—2, Fig. 1, Fig. 3, an enlarged vertical section along the line 3—3, Fig. 2, Fig. 4, a section taken along the line 4—4, Fig. 3, Fig. 5, a section taken along the line 5—5, Fig. 1, and Fig. 6, a detail view of the auxiliary cutting member referred to in the foregoing description.

Referring to the drawings by numerical reference characters, 2 designates a table, the top 3 of which is supported upon legs 4 and provided along one of its sides with an elevated bench 5 for the support of the cutting elements hereinafter to be described. The body portion of the top has a pair of rails 6 for the support and guidance of a carriage 7 upon which in practice, the joint of meat to be divided is disposed, and an electric motor 8 is mounted upon a shelf 9 at the lower portion of the table to provide the power required to operate the several coöperative parts of the mechanism.

The cutting elements above referred to include a circular saw 10 at the end of a shaft 12 which is rotatably mounted in bearings 13 on the elevated bench of the table, and a pair of circular knives 14 which are mounted one above the other at the ends of bifurcated arms 15 which are movably supported on the shaft 12 in divergent relation to each other. One of the branches of each of the arms is composed of two cylindrical casings 16 which are connected by a tube 17. One of these casings is rotatably mounted upon the shaft of the saw while the other provides a bearing for the shaft 18 of the respective knife.

A shaft 20 rotatably mounted in the tubular connection between the two casings carries at its ends, beveled gear-wheels 21 which mesh with corresponding gear wheels 22 on the shafts 12 and 18 for the purpose of transmitting the rotary movement of the saw to the knives while permitting an adjustment of the latter in a circular path about the axis of the shaft 12.

The ends of the knife-carrying arms 15 at which they are supported on the shaft of the saw are provided with lugs 23 best shown in Fig. 3, one of which carries an adjustable screw-stop 24 which engages the other to determine the minimum angle of divergence between the two arms and a threaded standard 25 which is vertically adjustably supported in a correspondingly threaded opening in the bench 5, carries two springs 26 which by engagement with the arms, yieldingly oppose their movement about their axis of rotation when the two knives are separated by the bone of a joint of meat passing between the same. Adjustably mounted on the same standard 25 is the auxiliary cutter which as shown in Fig. 7, consists of a threaded collar 27 for its connection with the standard, an arm 28 which is pivotally mounted on the collar and normally supported upon a spring 29 which at one of its ends is secured to the same, and two convergent knife-blades 30 which are fulcrumed at the outer end of the arm 28 and yieldingly maintained in their normal relative positions by means of a spring 31.

The knives 30 are disposed with their pointed ends adjacent the space between the circular knives 14 as is shown in Fig. 3 so that when the bone of a meat joint passes through the said space, one of the other of the knives 30 will engage the surface thereof to produce a cut in the thereto adjacent portion of the meat that cannot be reached by the circular knives, and thereby provide a path for the saw which thus is enabled to engage the bone without coming in contact with any of the meat surrounding the same.

The saw shaft 12 is in the operation of the machine driven by means of a crossed belt 32 that connects it with the shaft 33 of the motor which extending underneath the table, is rotatably supported in bearings 34 and provided at its end with a beveled gear wheel 35 which meshes with a corresponding gear 36 at the lower extremity of a vertical crank shaft 37 which extends through a bearing 38 applied to the top of the table 3. A crank arm 39 at the upper end of the shaft 37 is by means of a pitman 40 connected with a pin 41 at the end of the carriage so that when the said shaft is rotated by its operative connection with the motor shaft, a reciprocating movement is imparted to the carriage 7 along the rails 6, for the purpose of moving a joint of meat supported thereon in engagement with the knives and the saw and back to its original position at the forward end of the table as is illustrated in Fig. 1.

The mechanism provided for feeding a joint of meat automatically a predetermined distance on the carriage after a slice has been severed therefrom by the action of the cutting elements, consists of a feed board 42 which is disposed upon the upper surface of the carriage to engage the side of the meat opposite to that engaged by the cutting elements and which has at the end of an extension which projects through a transverse slot 43 in the carriage, a nut 44 for its operative connection with a feed screw 45 which is rotatably mounted in the recess 46 of the carriage in which the pitman 40 has its movement. The screw 45 has its end extending through a side of the table, a handle 47 whereby if so desired, it may be manually rotated to move the feed board and meat engaged thereby in the direction of the cutting elements, but the same result is automatically accomplished during the reciprocating movement of the carriage by the following mechanism. A longitudinally extensible rod 48 is at one of its ends pivotally mounted on the table, for convenience on an extension of the pin 41, and its other end extends in the path of an antifriction roller 49 which is mounted on the wrist of the crank arm 39. A spring 50 maintains the rod 48 normally in engagement with a stop which is provided by a headed pin 51 which is suspended in one of a series of countersunk openings 52 in the top of the carriage and it has a movable connection with a rack bar 53 whose teeth engage those of a pinion 54 mounted on a shaft 55 which is supported in boxes 56 in the recess of the carriage and which has a beveled gear 57 in operative engagement with a corresponding gear 58 on the feed screw 45.

The connection of the rack 53 with the rod 48 is such that it can move upwardly and is held by gravitation in engagement with the pinion and the teeth of the rack are of ratchet form so that when the latter is moved in the direction of the arrow A in Fig. 1 by the engagement of the roller 49 on the crank arm, it will impart a partial rotation to the pinion while when after it has been released by the roller, it is returned to its original position by the action of the spring 50, it will move over the pinion without effecting a movement thereof.

The clamping element for securing the joint of meat in its adjusted position on the carriage, consists of two uprights 59 and 60 which are toothed at their outer edges for the adjustable connection of a transverse clamping member 61. One of the uprights 59, is fixedly secured to the carriage, while the other is longitudinally movably supported upon a spring 62 and extends through an opening in the carriage to engage at its lower extremity with a cam 63 which is mounted on the table at its forward end for the purpose of raising the upright and the therewith connected clamping member to release the piece of meat, while it is being advanced by the automatic feeding mechanism hereinabove described.

The clamping member 61 consists of a collar 64 which is adjustably held on the upright 59 by means of a set screw 65 and a serrated bar 66 which at one of its ends is pivotally connected with the collar 64 and which at its other extremity has an opening for the admission of the upright 60 and a spring catch 67 adapted to engage the teeth of the same.

To secure the meat to the feed board 51 and thus prevent its lateral displacement, the latter is provided with a number of hooks 68 to which a chain which for obvious reasons has been omitted from the drawings, may be fastened after having been drawn over the joint placed on the carriage.

Having thus described the mechanical construction of my meat cutting machine, its operation will be readily understood: A joint of meat having been secured on the carriage in the above described manner, the motor is started to impart simultaneously, a rotary motion to the knives and the saw, and a reciprocating movement to the carriage. The end of the joint which extends across the planes in which the cutting elements rotate, engages during the forward movement of the carriage in the direction of the arrow B, Fig. 1, first, the knives 14 which cut through the meat to the bone, when they separate against the action of the springs 26 for the passage of the latter which subsequently is engaged by the saw 10, it being understood from the foregoing description that the auxiliary cutting member has previously provided a path for the saw through the small portion of the meat immediately surrounding the bone, which cannot be reached by the rotary knives.

When the carriage has reached the end of its forward stroke, a slice of the meat whose thickness is determined by the distance the end of the latter projects beyond the plane of the saw at the beginning of the movement, has been separated from the piece secured upon the carriage by the clamp and, if so desired, by a chain fastened to the hooks on the board 42 and during the return movement of the carriage when it approaches the forward end of the table, the roller on the wrist of the crank arm engages the end of the rod 48 which in consequence, is moved about its pivot and through the instrumentality of the rack 53, the pinion 54 and the gears 57 and 58, imparts a rotary movement to the feed screw for the purpose of advancing the board in the direction of the arrow C, Fig. 1, until after the carriage has commenced its subsequent forward movement the roller disengages the end of the rod and the latter is returned to its original position in engagement with the stop 51 by the action of the spring 56.

Before the roller is brought into engagement with the rod during the return movement of the carrier, the lower end of the longitudinal movable upright 60 has begun to ride upon the upper surface of the cam 63 to disengage the clamping member 61 from the joint of meat and allow the latter to move with the board 42, and the said member is held in the raised position until after the roller has disengaged the end of the rod 48 during the forward movement of the carrier when the upright moving off the cam 63 returns through the action of the spring 62, the transverse member 61 to its original position in engagement with the joint of meat.

The thickness of the slices severed from the joint may be varied by changing the position of the stop 51 which determines the extent of the movement of the rod 48 and in consequence that of the board 42. The rotary knives 14 are preferably placed to move in a plane which extends obliquely with relation to that in which the saw rotates, for the purpose of widening the cut produced in the meat and of facilitating the access of the saw to the bone.

It will be understood that the apparatus as shown and described is susceptible of slight variations in the construction and arrangement of its parts without sacrificing any of the advantages of the invention or departing from its principle.

What I claim and desire to secure by Letters-Patent is:

1. In a meat-cutting machine, a rotary saw, arms mounted to move about the axis of rotation thereof, knives rotatably mounted on said arms, means on said arms to transmit the rotary movement of the saw to the knives, a reciprocating carriage, and means for the simultaneous operation of said saw and said carriage, said knives and said saw being disposed to successively engage a joint of meat carried on said carriage.

2. In a meat-cutting machine, a rotary saw, arms mounted to move about the axis of rotation thereof, knives rotatably mounted on said arms, means on said arms to transmit the rotary movement of the saw to the knives, springs to yieldingly oppose a movement of said arms, a reciprocating carriage, and means for the simultaneous operation of said saw and said carriage, said knives and said saw being disposed to successively engage a joint of meat carried on said carriage.

3. In a meat-cutting machine, a reciprocating carriage, a pair of rotary knives and a rotary saw disposed to successively engage a joint of meat carried on said carriage, and an auxiliary cutter adapted to cut a path for the saw through the portion of the meat adjacent the bone of the joint, which is not severed by the knives.

4. In a meat-cutting machine, a reciprocating carriage, a pair of rotary knives and a rotary saw disposed to successively engage a joint of meat carried on said carriage, and an auxiliary cutter comprising a self-adjusting knife disposed to sever meat adjacent the bone of a joint prior to its engagement with the saw.

5. In a meat-cutting machine, a reciprocating carriage, a pair of rotary knives and a rotary saw disposed to successively engage a joint of meat carried on said carriage, and an auxiliary cutter comprising a pivoted knife disposed to sever meat adjacent the bone of a joint prior to its engagement with the saw, and a spring to yieldingly maintain said knife against a movement about its pivot.

6. In a meat-cutting machine, a reciprocating carriage, a pair of rotary knives and a rotary saw disposed to successively engage a joint of meat carried on said carriage, and an auxiliary cutter comprising a pivoted arm, a pair of convergent knives pivotally mounted on said arm and disposed to sever the meat adjacent a bone of a joint prior to its engagement with the saw, and a spring to yieldingly hold said arm against a movement about its pivot.

7. In a meat-cutting machine, a reciprocating carriage, a cutting element disposed to sever a joint of meat carried thereon, mechanism on said carriage for advancing said joint, and an appliance including a spring held clamping member on the carriage for engagement with the joint, and a cam for disengaging said member from the joint during a determinate period in the movement of the carriage.

8. In a meat cutting machine, a reciprocating carriage, a cutting element disposed to sever a joint of meat carried thereon, mechanism on the carriage for advancing said joint, an appliance for holding the joint on the carriage, including a spring-controlled movable upright, a second upright, and a member mounted on said uprights to engage the joint, and a cam disposed to engage the said movable upright for moving it against the action of its spring, during a determinate period in the movement of the carriage, for compelling the said member to release the joint.

9. In a meat cutting machine, a reciprocating carriage, a cutting element disposed to sever a joint of meat carried thereon, mechanism on the carriage for advancing said joint, an appliance for holding the joint on the carriage, including a spring-controlled, movable upright, a member connected with said upright to engage the joint, and a cam disposed to engage the said upright for moving it against the action of its spring, during a determinate period in the movement of the carriage, for compelling the said member to release the joint.

10. In a meat-cutting machine, a reciprocating carriage, a cutting element disposed to sever a joint of meat carried thereon, mechanism on the carriage for advancing said joint, an appliance for holding the joint on the carriage, including an upright adapted for bodily movement in a vertical plane, a member connected with the upright to engage the joint, and a cam disposed to impellently engage said upright during a determinate period in the movement of the carriage for compelling the said member to release the joint.

11. In a meat-cutting machine, a frame, a carriage mounted thereon for reciprocation, a cutting-element disposed to sever a joint of meat carried on the carriage, mechanism on the carriage for advancing the joint, a device mounted on the carriage and adapted for bodily movement in a vertical plane and normally securing the joint on the same, and a cam disposed on the frame to impellently engage the said device, for compelling it to release the joint, during a determinate period in the movement of the carriage.

In testimony whereof I have affixed my signature in presence of two witnesses.

EARL M. BENTON.

Witnesses:
J. HALL JONES,
J. E. HOOLEY.